July 21, 1953 F. L. PORTH 2,646,364
METHOD OF PRODUCING REFLECTING FILMS, DECALCOMANIAS, AND SIGNS
Filed July 15, 1949 2 Sheets-Sheet 1
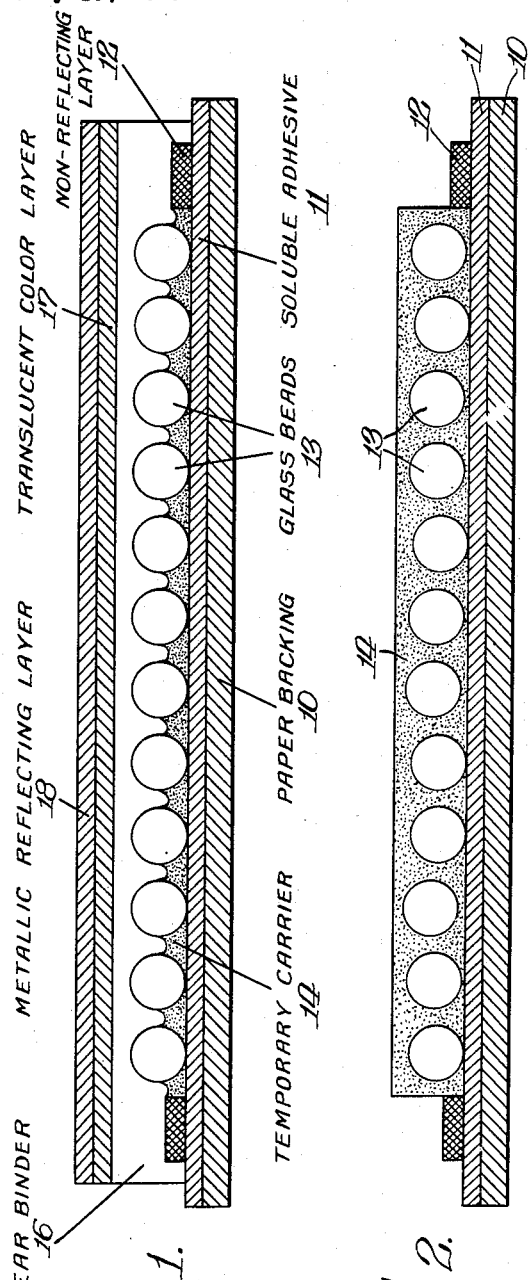
INVENTOR.
Frank L. Porth,
BY
Davis, Lindsey, Hibben + Noyes
Atty's.

July 21, 1953  F. L. PORTH  2,646,364
METHOD OF PRODUCING REFLECTING FILMS, DECALCOMANIAS, AND SIGNS
Filed July 15, 1949  2 Sheets-Sheet 2
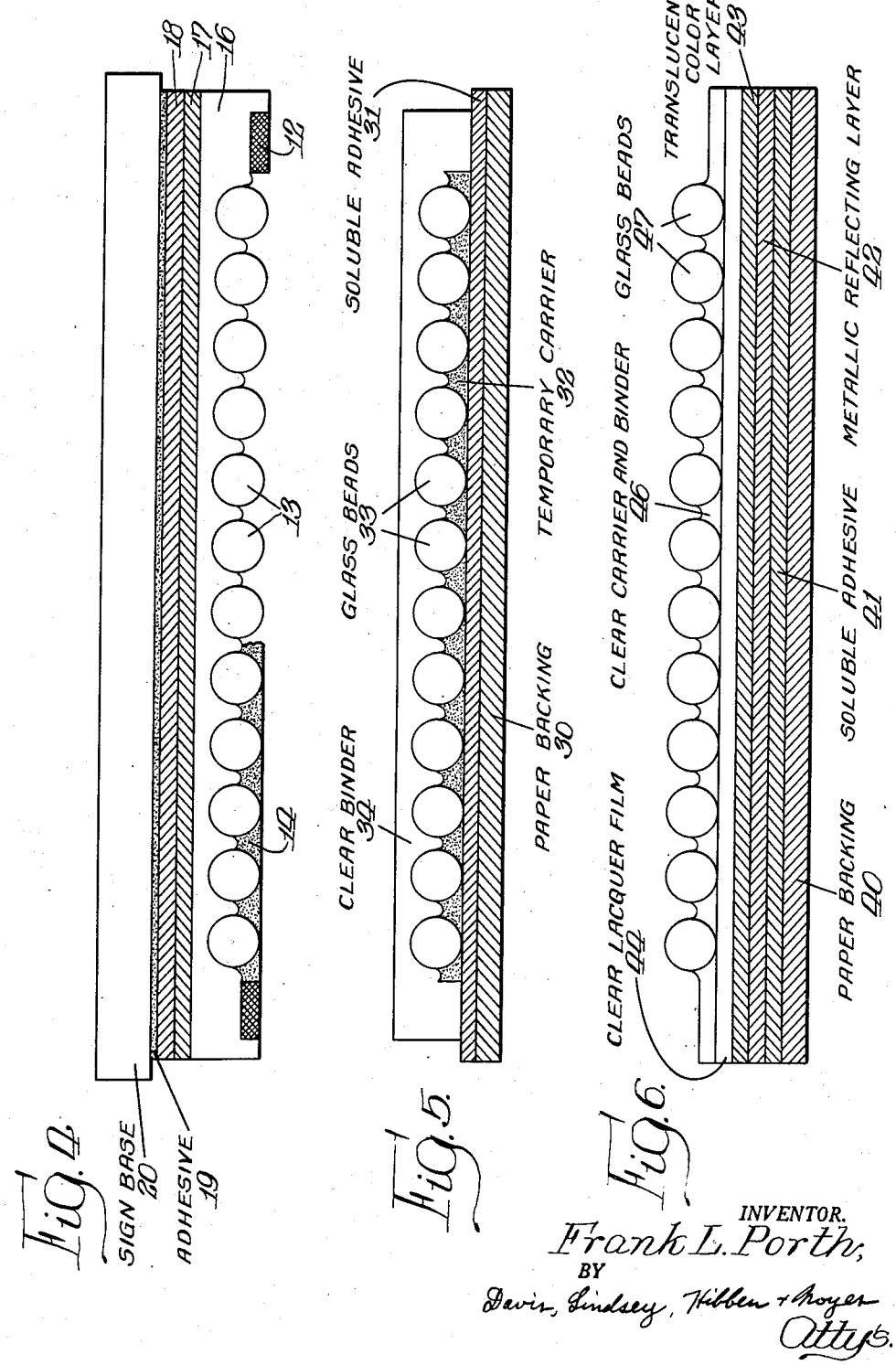
INVENTOR.
Frank L. Porth,
BY
Davis, Lindsey, Hibben + Noyes
Attys.

UNITED STATES PATENT OFFICE 2,646,364

METHOD OF PRODUCING REFLECTING FILMS, DECALCOMANIAS, AND SIGNS

Frank L. Porth, Hillside, Ill., assignor to The Meyercord Company, Chicago, Ill., a corporation of Illinois Application July 15, 1949, Serial No. 104,952

8 Claims. (Cl. 117—3.5)

This invention relates to reflecting films, decalcomanias and signs of the type embodying small reflex reflecting elements, such as small glass spheres or the like, and more particularly to novel and advantageous methods of producing such films, decalcomanias and signs. This general type of reflecting media has application to highway markings, advertising, decoration and a wide variety of other uses wherein it is desirable to provide brilliant surface effects for attracting attention or for conveying information. This application is a continuation-in-part of my copending application Serial No. 32,415, filed June 11, 1948.

Heretofore, in the production of reflecting films, reflecting decalcomanias and signs of various types utilizing small glass beads partially embedded in a binder layer, the glass beads have been customarily applied to the binder layer while the material composing that layer was still in a tacky or plastic condition. The application of the beads to the tacky binder was accomplished in a variety of ways, such as by strewing, sprinkling, scattering or dropping them in excess on the upper surface of the binder layer from a container or a hopper. Then after application, the excess glass beads were removed and those adhering to the binder were caused to partially embed themselves therein either under their own weight or by means of a pressure member such as a flat plate or a pressure roller.

However, such long established manner of application has proven to be not wholly satisfactory for various reasons, not only from the production standpoint but also because in many instances the resulting reflecting films, reflecting decalcomanias or signs were defective and possessed certain undesirable characteristics. One such characteristic was the relatively uneven distribution of the glass beads on the binder surface since the beads frequently formed in thick piles or groups while other portions of the binder layer were partially devoid of beads. This resulted in a product having relatively large dead or non-reflecting areas.

Another disadvantage of such uncontrolled sprinkling or scattering was that the beads tended to pile up on each other or to overlie each other to a certain extent and because the binder was plastic or tacky rather than flowable when the beads were applied, the beads, even under pressure, were not always pressed down evenly so as to form a flat, smooth reflecting surface. As a result, the surface in many instances was relatively uneven with minute peaks and depressions formed therein, and because a portion of one bead overlay a portion of another, the passage of light therethrough was interfered with causing improper reflection. It was quite difficult by such method to secure an even, smooth, single layer of beads arranged in a substantially single plane on the film, and the resulting reflecting film, unless extreme care was taken in the application of the beads, was unduly thick and uneven with reduced reflective efficiency.

A further undesirable result of the gravity application method was that a fair percentage of the beads failed to become firmly anchored or embedded in the binding layer and, consequently, after a relatively short period of use under normal weather conditions, the beads became loosened and separated from the binding layer thus detracting from the reflecting qualities of the sign. In order to more firmly embed the beads in the binding layer, pressure means such as rollers or flat plates were resorted to, but the amount of pressure was difficult to control as the beads were not regularly distributed over the binder surface nor were they disposed at regular heights. It was desirable that the beads be pressed down into the binder only to an extent of a fraction of their diameter so that the upper portion thereof projected above the binder surface for proper reflecting operation of the sign. However, even though the beads were initially embedded to a nearly proper distance when the binder was tacky, this relationship did not continue to exist when the binder became dry. As the material composing the binder layer dried, it tended to dry away from the lower portions of the beads so as to reduce the socket area for each bead. In other words many of the beads were forced by drying of the binder to assume positions more nearly at the top surface thereof and the so-called binder merely enveloped a small portion of the lower half of the bead. The binder failed to a great degree to accomplish its intended function.

The gravity or sprinkling method of application also was wasteful of glass beads in that they were always applied to the binder layer in excess and provision had to be made to recover the non-adhering beads and return them to the hopper or source of supply. During application and recovery, many beads were spilled onto the floor or onto other adjoining surfaces and they not only made footing dangerous for the operators and interfered with operations, but they also were difficult to collect and were unfit for reuse due to contamination and mixture with foreign substances. To rectify such disadvantages, attempts were made by provision of special structures to confine the beads during the sprinkling application, but for the most part they did not prove entirely successful. Furthermore, where attempts were made to apply beads of a very small diameter in an effort to product a thin reflective film, it was found that the problems of even distribution and control were all the more difficult, since the drafts and air currents in production rooms, resulting from normal ventilating conditions or from the movement of conveyor belts or paper webs comprising part of the film, caused the small beads to be blown about out of control. The very small beads thus were incapable of proper handling and application, and their use was discouraged in favor of beads of larger sizes.

It is, therefore, one of the objects of the present invention to provide an improved process for the production of a reflecting film, a reflecting decalcomania or sign by which a mixture of glass beads and a flowable carrier may be applied to a supporting surface through a stencil screen in accordance with the screen printing process.

Another object is the provision of an improved process for the production of a reflecting film, a reflecting decalcomania or sign comprising the application of a mixture of glass beads and a flowable carrier to a surface through a screen, the thickness of the screen relative to the diameter of the glass beads being such that substantially a single layer of glass beads may be forced down within the interstices of the screen by the squeegee.

A further object is the provision of a process similar to that described in the foregoing object in which the thickness of the screen is slightly greater than the diameter of the glass beads so that substantially a single layer of glass beads may be received within the interstices of the screen as the squeegee passes thereover and said beads may, after removal of the stencil screen, settle or be drawn downwardly into contact with the supporting surface and may also spread slightly horizontally to occupy the space formerly occupied by the silk screen portions between the interstices.

Another further object is the provision of an improved process for the production of a reflecting film or decalcomania which comprises the steps of forming on a supporting surface a coating of a temporary carrier material with glass beads embedded therein with the upper portions of the beads being exposed and projecting above the surface of said carrier material, applying a layer of a permanent binder material in a liquid state over and between the exposed surfaces of the glass beads and then drying the binder material to firmly and permanently embed the beads therein.

Another object is the provision of an improved process for the production of a reflecting film or decalcomania which comprises the steps of applying to a supporting surface a mixture composed of glass beads in a temporary, removable, liquid carrier capable of shrinking down upon drying to a fraction of its original thickness, drying the carrier so that a large portion of the upper surfaces of the glass beads become exposed, applying a layer of a permanent binder material in a liquid state over and between the exposed surfaces of the glass beads and then drying the binder material.

Another object is the provision of an improved process similar to that disclosed in either of the two preceding objects but including the steps of removing the supporting surface from the dried glass bead carrying layer and then removing the temporary carrier from the lower surfaces of the glass beads and from the permanent binder layer.

Another object is to provide a method of forming a reflecting film containing a multiplicity of small, transparent glass beads which comprises applying to a supporting surface a layer of a mixture of small glass beads and a carrier or binder capable of drying to a reduced thickness and then drying the carrier or binder to expose the upper portions of the beads.

Another object is the provision of an improved process for the production of a reflecting film which comprises the steps of applying to a removable supporting surface a mixture comprised of glass beads in a temporary soluble liquid carrier capable of shrinking down upon drying to a fraction of its original thickness so as to expose a large portion of the upper surfaces of the glass beads, drying the carrier to expose the upper surfaces of the beads, applying a layer of a permanent binder material in a liquid state over and between the exposed surfaces of the glass beads, drying the binder material, removing the temporary carrier from the lower surfaces of the glass beads and from the permanent binder layer by the application of a solvent in which only the temporary carrier and not the binder layer is soluble.

Still another specific object is to provide an improved process of forming a reflective sign comprising the steps of applying to a removable backing having a supporting surface a mixture composed of glass beads in a temporary, removable, liquid carrier capable of shrinking down upon drying to a fraction of its original thickness so as to expose a large portion of the upper surfaces of the glass beads, drying the carrier to expose the upper surfaces of the beads, applying a layer of a permanent binder material in a liquid state over and between the exposed surfaces of the glass beads, drying the binder material, applying an adhesive to the outer surface of said binder material and applying the composite layers to a sign base, removing the supporting backing, and removing the temporary carrier from the lower surfaces of the glass beads and from the binder layer to expose the same for the admission of light rays.

Other and further objects and advantages of the present invention, and variations and modifications of the above-stated objects thereof, will become apparent hereinafter as this description progresses, reference being had to the accompanying drawings, in which:

Figure 1 is a diagrammatic, vertical sectional view of a reflecting decalcomania of the face-down type produced in accordance with the improved process comprising the present invention;

Fig. 2 is a diagrammatic, vertical sectional view of the improved reflecting decalcomania illustrating the layer of the mixture composed of glass beads in a temporary liquid carrier immediately after it has been applied to the soluble adhesive coating of decalcomania paper and while the liquid carrier is still wet;

Fig. 3 is a diagrammatic view similar to that of Fig. 2 but illustrating the manner in which the temporary carrier has, upon drying, shrunk down away from the surfaces of the upper halves of the glass beads so as to expose the same;

Fig. 4 is a diagrammatic, vertical sectional view showing the reflective transfer of Fig. 1 after it has been applied to a sign base and the decalcomania paper has been removed, the temporary carrier layer being shown partially removed from the outer or lower surfaces of the glass beads and from the binder layer;

Fig. 5 is a diagrammatic, vertical sectional view of a modified form of reflecting decalcomania produced by the process comprising the present invention and comprising the clear, uncolored transparent type and not incorporating any color layers, this form being particularly applicable to any already colored or decorated sign base; and Fig. 6 is a diagrammatic, vertical sectional view of a decalcomania of the face up type also produced in accordance with the improved process comprising the present invention.

The reflecting decalcomania disclosed in Fig. 1 of the drawings which is manufactured in accordance with the novel and improved process of the present invention, comprises a releasable backing of the conventional decalcomania paper 10 having thereon a layer of soluble adhesive 11, which facilitates separation from the composite structure as water is caused to penetrate through the paper 10 and soften the soluble adhesive 11. The reflecting transfer which is removably carried by the decalcomania paper may be reflecting over its entire area or it may be provided with non-reflecting areas 12 to provide areas of contrast with the reflecting portions. These non-reflecting areas which may be applied to the soluble adhesive layer 11 may be composed of any opaque non-reflecting material.

On top of the soluble adhesive layer 11 and between the non-reflective areas 12 there is a composite layer in which is embedded a layer of small, transparent glass beads or spheres 13, the lower portions of the glass beads being embedded in a removable carrier layer 14 composed of a soluble and flexible temporary carrier material and the upper portions of the glass beads 13 being firmly anchored in a layer 16 of a permanent, uncolored, clear, transparent binder material. As will be explained in further detail hereinafter, the material of the permanent binder layer 16 is of different composition and has different characteristics than the temporary carrier material 14, it being particularly important that the binder layer 16 be resistant to and remain unaffected by the solvent used to remove the temporary carrier material 14. The clear binder layer 16 also overlies and overlaps as a seal the non-reflecting areas 12 so as to engage the inner surfaces thereof and to contact a portion of the soluble adhesive layer 11.

As shown clearly in Fig. 1, all the glass beads 13 are arranged, in accordance with the process of the present invention, in a single layer and their lower ends are in engagement with the smooth upper surface of the soluble adhesive layer 11, the beads thus being disposed in one plane and their lower ends presenting a substantially even, smooth, composite lower surface. It is to be understood that the spacing between the glass beads 13 has been somewhat exaggerated in the drawings for the purposes of this description and that in reality the side faces of the beads in most cases are actually in engagement or almost in engagement thus providing a tightly beaded surface. Wherever voids or blank spaces do occur between the beads, they are of such minute size as to be of no consequence or effect on the overall reflective efficiency of the finished film. The clear binder layer 16 is of such thickness that the distance between a reflective metallic layer 18 and the uppermost faces of the beads does not exceed one-third the diameter of the glass beads, this spacing serving to widen to the desired extent the inner aperture through which light rays pass in reaching and returning from the inner reflective surfaces. Where the thickness of the binder layer 16 over the upper end faces of the glass beads 13 is substantially greater, the reflective characteristics of the structure is materially reduced, and likewise the same general result follows where the beads are very close to the inner reflective surfaces.

On top of the clear binder layer 16, there is a color layer 17 of translucent material of the desired color, or combination of colors which may be laid down side by side to form the colored design desired to be reflected and shown only diagrammatically in the drawing as the single layer 17. The material composing this translucent layer 17 may be any one of a great variety of substances such as lacquers or varnishes containing pigments or dyes. The final coating on the top of the translucent color layer 17 is a highly reflective layer of metallic material 18 such as an aluminum powder in a nitrocellulose varnish. By this metallic coating 18 which provides maximum reflection and minimum light absorption, the color characteristics of the color layer 17 are emphasized and made more vivid. The reflective qualities of this composite color reflecting means are greater than if a single reflective color layer were employed. However, in accordance with the novel features of the process of the present invention, a single reflective color layer may be provided for achieving quite satisfactory results without employing the translucent color layer in combination with the highly reflective metallic layer, it being understood that the present invention may be utilized in producing a variety of combinations. Furthermore, the non-reflecting areas, instead of being positioned as indicated by the numeral 12 in the drawings, may alternately be laid down over the permanent binder layer 16 as part of the composite color layer 17 so as to form non-reflecting areas therein in the same plane.

A specific example of a formula of the ingredients composing the materials of the temporary carrier layer 14, the binder layer 16, the translucent color layer 17 and the reflecting metallic layer 18, is as follows:

Temporary carrier layer 14:
    Ethyl cellulose _____oz__ 26
    Cellosolve (2 - ethoxy - ethanol) solvent _____gal__ ⅛
    Castor oil-plasticizer _____gal__ 1/16
    Add to this mixture an equal quantity of glass beads.

Permanent binder layer 16:     Percent by weight
    Nitrocellulose _____ 20
    Cellosolve (2-ethoxy-ethanol) solvent __ 66.8
    Castor oil-plasticizer _____ 13.2

Translucent color layer 17:
    This material is formed by adding to the same material comprising the binder material 16 a dry lake dye of the desired color. The amount of color added varies with the type of color. For example, where red is added, the amount is 5% and where yellow is added, the amount is approximately 2½%.

Reflecting metallic layer 18:
This material is formed by adding an equal amount of aluminum powder to an equal amount of the same material comprising the binder material 16.

The novel and improved form of reflecting film and decalcomania which has been described generally above, may be formed entirely by the screen printing process although other methods of application may also be utilized in accordance with the teachings of the present invention. The non-reflecting areas 12 may first be laid down in the desired areas on the top surface of the soluble adhesive layer 11 of the commercial decalcomania paper 10, by forcing an opaque paint through a silk screen provided with the proper design. These opaque areas may be in the form of a number or letter or other design which is to be noted and understood by the observer, this being accomplished by contracting with the reflective background in which the glass beads are incorporated. The reverse arrangement, however, may also be utilized and in such an arrangement the opaque areas may form the background and the contracting reflective areas may constitute the design or number to be observed.

After the non-reflecting areas 12 have dried, the temporary carrier layer 14 with the glass beads 13 therein is then laid down by the screen printing process on the upper surface of the soluble adhesive 11 adjacent the non-reflecting areas 12. The material from which the temporary carrier layer 14 is formed, as set forth in the example, may be a clear, soluble material such as ethyl cellulose containing a sufficient quantity of plasticizer to afford proper flexibility of the dried film and a sufficient quantity of evaporable solvents to afford a proper degree of fluidity for screen printing and to insure that the layer 14 will shrink down upon drying by evaporation of the solvents to a considerably reduced thickness such as approximately fifty percent (50%) of its thickness when wet. The carrier mixture 14 may also be applied as a coating by means of a roller, knife, brush or other suitable apparatus.

The glass beads may be quite small in size, such as .003 of an inch in diameter, this reduced size resulting in a decalcomania which is thin, smooth and flexible. The mixture which is screen printed may be composed of one part ethyl cellulose, plasticizers and solvents to approximately one part of glass beads, these measurements being by volume rather than by weight. Because the glass beads have a greater specific gravity than the ethyl cellulose composition, they tend to sink to the bottom of the container and consequently, it is highly important that the mixure of ethyl cellulose and glass beads be thoroughly and constantly agitated prior to and during use. When the mixture has been thoroughly and properly agitated, the beads will be more or less uniformly distributed throughout the body thereof with the number of glass beads in one cubic unit of volume being substantially or almost the same as those in another cubic unit.

This mixture may then be supplied to the fountain of a screen printing machine from which it is picked up by a reciprocal squeegee and forced down through the interstices of a silk, copper or stainless steel stencil screen as it passes back and forth thereover. It has been found that if the mixture is initially agitated to the proper extent so as to achieve uniform distribution of the beads throughout the mixture, the movement of the squeegee and the movement of the mixture at the respective ends of the screen is sufficient to keep the mixture constantly agitated so that the beads will remain in properly spaced suspension. The consistency of the mixture is such that it may be screened in the usual manner so as to readily pass down through the interstices of the screen without running or sticking.

In order that substantially a single layer of glass beads may be laid down in a relatively uniform manner on the upper surface of the soluble adhesive layer 11 so that they will not pile up or overlie each other, a definite relationship between the thickness of the screen and the thickness of the glass beads utilized must be maintained. The thickness of the screen employed controls the amount of glass beads applied to the adhesive layer 11. It is imperative that the thickness of the screen be not much greater than the diameter of the glass beads, although a screen of equal thickness may approximate satisfactory results. For example, where the diameter of the glass beads of the screenable mixture is .003 of an inch, the silk, copper or stainless steel screen preferably should not exceed a thickness of .004 or .005 of an inch, and when the glass bead diameter is as high as .006 of an inch, the screen should not exceed .008 or .010 of an inch in thickness. The interstices of the screen, however, are of a width and length sufficient to admit a plurality of glass beads in a substantially horizontal layer so that a group is formed on the adhesive layer 11 through each interstice of the screen. It is understood that when the beads are received within the screen interstices, they are not, when the screen is still in engagement with the releasable backing, arranged perfectly in the same plane but a few of them may be slightly higher or wedged in over the others.

Thus, as the squeegee moves over the screen in frictional contact therewith it forces or presses down through the open interstices of the screen the mixture of ethyl cellulose and a substantially single layer of glass beads. Since a double layer of glass beads in and over any single screen opening would cause the top layer of beads to project above the screen to an extent equal to all or a major portion of their diameter, the top or second layer of beads is not down within the screen opening so as to be protected thereby from the squeegee. Hence, the squeegee as it passes over the screen forces any second layer of glass beads ahead of it leaving substantially a single layer in the interstices of the screen.

Where the screen thickness is the same as the diameter of the beads, there is little or no chance that a few extra beads, which would be in slightly raised position, will remain in the screen opening due to the squeegee action. It is desirable, however, that a few extra beads be included in each screen opening in slightly elevated position in order that the space on the backing occupied by the portions of the screen between the interstices may later be occupied by the beads when the screen is removed. This is accomplished by having the screen slightly greater in thickness than the diameter of the beads so that a few may be protected from the squeegee even in slightly elevated position. As soon as the bed of the press with the paper backing thereon has been lowered away from the screen, those few beads which are in slightly elevated position move down into contact with the adhesive coating 11 as the other glass beads spread or give way horizontally so as to provide space therefor, and to occupy the space on the backing formerly occupied by the screen threads between the interstices during printing. The temporary carrier comprising the ethyl cellulose compound possesses sufficient fluidity or flowability to permit this settling and spreading movement of the beads. Thus, the glass beads are formed into a substantially single layer without overlying each other so as to form peaks and depressions and the lines of the stencil screen are eliminated. The settling or movement of the glass beads down into substantial contact with the adhesive coating 11 is believed to be effected somewhat by the weight of the beads themselves and partly by the surface tension of the carrier material with respect to the glass beads. Since the carrier material as it dries tends to remain in engagement and retain a grip on the side surfaces of the beads, the beads are pulled downwardly as the layer dries downwardly.

It is to be noted that the lower faces of the glass beads, as a result of squeegee pressure, settling under their own weight or by the surface tension, engage the smooth upper surface of the soluble adhesive layer 11, and, consequently, they are arranged in substantially a single plane that is relatively smooth and even, the lower faces of the beads being substantially the same distance from the source of light when in use and their upper faces being substantially the same distance from the upper surface of the binder layer 16 and the color and reflecting layers 17 and 18, respectively. This even arrangement of the beads results in uniform light reflection, and the improved process of producing such an arrangement and comprising the present invention insures uniformity of products.

However, the finished film of decalcomania does contain in some instances and in some portions of its area some surface irregularities and non-uniform bead distribution. But such partial defects result for the most part from improper mixing of the beads in the carrier, from imperfections in the screen and squeegee, from failure to maintain the proper operational relationship between the thickness of the screen and the thickness of the glass beads, and from differences in the sizes of the beads themselves. It frequently happens that beads furnished by a manufacturer as being of a certain size, such as .003 of an inch in diameter, range somewhat above and below that figure, with the result that the larger beads will appear microscopically to project slightly higher than the others. Yet these differences in heights are so infinitesimal that the surface produced still may be considered smooth for all practical purposes and its overall light reflective efficiency is in no way impaired.

In Fig. 2, the partially formed decalcomania is shown somewhat diagrammatically as it appears shortly after it has been separated from the silk screen. Some of the glass beads 13 have been forced down into contact with the adhesive layer 11 by the squeegee while others are still slightly raised therefrom but already in the process of settling or being drawn down and spreading. The temporary carrier 14 comprising the ethyl cellulose composition still extends around and over the upper surfaces of the glass beads 13. The partially formed decalcomania is then permitted to dry, or may be dried by the application of heat, and during this drying step of the process the solvent of the ethyl cellulose composition evaporates causing the layer of that composition to shrink down to approximately one half its original thickness toward the soluble adhesive layer 11. As a result, as shown in Fig. 3, the dried temporary carrier 14 is much thinner than in its wet state and at least the upper halves of the glass beads are exposed. Due to surface tension and capillarity, the upper surfaces of the carrier material 14 between the beads is curved downwardly from approximately the central side surfaces of the beads.

In Figs. 1 and 3 of the drawings, the temporary carrier layer 14 is illustrated as having shrunk or dried entirely away from the upper surfaces of those portions of the glass beads 13 which project above the main dried body portion thereof, and this fact and manner of illustration appear to be correct as a result of tests and visual observation. If, in fact, any of the carrier material 14 does remain over the upper bead surfaces, it is in the form of an extremely thin curving skin which in no way interferes with the reflective qualities of the film. Thus it must be understood for the purposes of the present disclosure that when it is stated that the upper portion of the glass beads are exposed by drying of the carrier material, the carrier material may be considered either as being completely and entirely withdrawn from the upper surface of the beads or may be considered as having remained in the form of an extremely thin skin. Whichever condition actually exists, the beads for the purposes of the present invention, are deemed to be exposed.

When the temporary bead carrier 14 has dried on the backing coating 11, the sheet may be brought into position under another stencil screen and the clear binder layer 16 is then laid down through the screen and flows over and between the beads and over the non-reflecting areas 12 and over part of the soluble adhesive layer 11 at the sides thereof. The material of which the clear binder layer is formed, as shown in the example, may be a clear, transparent nitrocellulose compound, although other compositions such as clear varnishes or varnish type alkyd resins may be utilized with satisfactory results. The clear binder material 16 must be of a different composition than the temporary carrier 14 in order that a solvent for the temporary carrier will not attach or dissolve the clear binder layer 16 when the temporary carrier is being removed by the solvent.

The clear binder coat 16 is applied in such a thickness that it will penetrate down between the glass beads to completely fill all the spaces therebetween resulting from shrinkage of the temporary carrier 14, and will extend over the tops of the glass beads to an extent not exceeding one third the diameter of the beads. Because there is also some shrinkage when the clear binder layer 16 dries, the binder material is applied in a thicker coating to permit drying down to the desired thickness. Although the temporary carrier 14 dries down toward the soluble adhesive layer 11 and hence away from the upper surfaces of the glass beads 13, drying of the binder layer 16 has just the opposite effect and results. Since the binder material 16 is applied over the exposed tops of the beads and down in between the beads so as to completely fill all the spaces therebetween and thereover, it cannot dry upwardly so as to pull away from the beads. The drying is mostly from the upper exposed surface of the binder layer 16, the beads being below the surface, and the tendency toward the creation of a vacuum prevents the binder material from pulling away from the glass beads. Thus, the binder material 16 actually dries down onto the glass beads 13 so that as a net result the beads are firmly embedded therein in an even, single plane.

The carrier layer 14 serves only a temporary purpose. It is not the permanent binder in which the beads 13 are held after the reflective film of the decalcomania has been transferred to a sign base. It serves merely as a carrier which permits the glass beads to be screen printed and to be arranged in a single, even layer. It serves to hold the glass beads in proper position so as to expose the upper portion thereof to the wet binder layer 16 in which the beads later become firmly embedded. It is not important that the beads be securely held in the carrier 14 with any degree of permanency. It is only necessary that they be held until the permanent binder coat 16 has been applied and has dried. In fact, the more insecurely any particular bead is held in the temporary carrier 14 because a smaller amount of its body is embedded in the carrier the more securely it will finally be embedded in the binder layer 16 inasmuch as there is more exposed body area of the bead to be enveloped by the binder coat as it flows over and between the beads. However, the nature of the carrier layer is such that upon shrinkage due to drying, approximately the upper one half of each bead will be exposed.

As shown in Figs. 1 and 3 of the drawings, the carrier layer 14 dries down to a greater extent away from the side surfaces of the glass beads 13 so that the upper surfaces of the carrier layer 14 between the glass beads are pitted or concave. Thus, when the permanent binder 16 is applied thereover, it flows on down into these concavities, thus forming well defined and relatively deep sockets in which the glass beads 13 are securely held against dislodgment.

After the clear, transparent binder layer 16 has been dried, the translucent layer 17 and the metallic layer 18 may then be applied by the screen printing process, the color layer 17 first being permitted to dry before application of the final metallic layer.

The decalcomania produced in the manner described in detail above and shown in completed form in Fig. 1 of the drawings, is designated as a "face down" type, the face of the transfer which eventually becomes exposed to the view of the observer being printed down against the soluble adhesive 11 and the layer which is attached to surface to be decorated being face up prior to transfer. The improved reflecting transfer may be readily applied to any sign base and the manner of application comprising an important feature of the present invention will be described in connection with Fig. 4 of the drawings. A quantity of adhesive 19 of any suitable type for outdoor use may be brushed onto the outer surface of the metallic reflecting layer 18 or may be applied directly to one surface of the sign base 20 to which the transfer may be applied. As an alternative a layer of adhesive may be screen printed on the back of the metallic layer 18 so as to become an integral part of the decalcomania and then when it is desired to apply the transfer to the sign base 20, the adhesive may be activated by heat or a solvent. After the adhesive has been applied or has been activated, whichever procedure is followed, the decalcomania is then placed in position on the sign base 20 and rolled down into intimate contact therewith.

After the adhesive 19 has dried, or possibly even before it has dried, water may be applied to the outer surface of the paper backing 10 so as to soften the soluble adhesive layer 11 and permit the paper 10 to be peeled away leaving the other layers adhering to the sign base 20. When the paper backing 10 has been removed, a quantity of a solvent is then applied to the temporary carrier by means of a solvent saturated rag or sponge, and by a rubbing action the entire temporary carrier layer may be wiped away from the glass beads 13, thus exposing all the surfaces thereof not enveloped by the clear binder material 16. In Fig. 4, the right hand portion of the temporary carrier layer 14 has been wiped away by the solvent and the left hand portion has yet to be removed. In the example given above, the temporary carrier 14 is composed of ethyl cellulose and hence denatured alcohol may be utilized as the solvent to effect its removal, it being understood that denatured alcohol is not a solvent for the nitrocellulose binder 16. The temporary carrier 14 may be colored or uncolored since in any event it serves only a temporary purpose and is always removed from the transfer when the sign is prepared. However, it is preferable that the carrier 14 be of clear transparent material so that in the event a minute quantity remains in between the glass beads 13 due to improper application of solvent or insufficient wiping, or remains in an extremely thin skin on the upper surface thereof, the reflective efficiency of the film will be little affected.

With the temporary carrier 14 removed, the surfaces of the lower, or now the outer, halves of the glass beads 13 are now fully uncovered and exposed toward any source of light. The glass beads 13 are firmly anchored or embedded in the permanent binder 16 and the sign thus prepared is capable of a long operable life under extreme weather conditions. The beads 13 are securely held against dislodgment and the color and metallic layers 17 and 18, respectively, are protected against weathering and remain bright and lustrous and highly reflective. The rays of light enter through the front surfaces of the glass beads 13 and pass on through the clear binder 16, through the translucent colored layer 17 to the surface of the metallic layer 18 from which they are reflected back through the above mentioned layers to the source of light in the well understood manner. The reflected light seen by the observer, however, is colored due to the color layer 17.

From the foregoing it is thus apparent that applicant has devised a greatly improved decalcomania and a method of producing and applying the same. The unsatisfactory gravity method of application of the glass beads, such as by sprinkling or scattering or dropping from a hopper, has been entirely eliminated together with the unsatisfactory results of that method. The glass beads are not piled up nor do they generally overlie each other so as to interfere with light transmission and reflection or to present a relatively thick decalcomania with a greatly roughened surface having a vast number of pronounced peaks and depressions in which foreign matter and dirt may readily cling and resist removal. On the contrary, the glass beads 13 in the present decalcomania are arranged in substantially a single layer in susbtantially a single plane with the inner and outer faces thereof in substantial alignment, and they are securely embedded to a regular, controlled depth in the binder layer. They are not, as in many prior decalcomanias, embedded to various depths in a wide range, some being secure and others not. The surface of the decalcomania comprising the present invention is extremely smooth to the touch and does not provide a "sandpaper" sensation or appearance as the prior reflective films.

Moreover, the old wasteful method of application of the glass beads has been eliminated and there is no possibility of their becoming scattered or blown about by air currents. A quantity of glass beads may be simply poured into a container of the ethyl cellulose carrier and then stirred, and during application thereafter the beads are held in the carrier. Hence glass beads of a very small diameter may be employed. Furthermore, the necessity of pressure means to embed the glass beads in the binder layer and all the uncertainties and variables accompanying the use of such means have also been eliminated.

Although the carrier layer 14 has been described above as being removable by means of a solvent therefor, it is also within the teachings of the present invention that the carrier layer be removable merely by a physical stripping action. To this end, a carrier material may be provided which may be screen printed and which will dry down to approximately one half of its wet thickness, but which at the same time would have, when dry, very little affinity for or adhesive effect on the lower portion of the glass beads or the binder layer 16. It is sufficient if the carrier material 14 be of a character capable of maintaining the beads in proper position during formation of the permanent binder layer 16 and retaining the transfer on the soluble adhesive layer 11 prior to application of the transfer. Thus when the paper backing 10 has been soaked off, such a carrier layer 14 may be removed merely by grasping an edge thereof and peeling the same away in a dry state from the glass beads 13 and the binder 16 without disturbing the glass beads in any way.

It is also apparent that the carrier layer 14 may comprise simply a glue or any other type of water soluble adhesive having the general characteristics above described. Thus, instead of requiring the use of a special solvent such as denatured alcohol, water may be applied to remove the same. In fact, the application of water to the paper backing 10 to soften the adhesive 11 would then have the effect of softening and starting the removal of the water soluble carrier 14.

It is further apparent that the temporary carrier layer 14, instead of containing a high degree of solvents to effect considerable shrinkage in thickness, could contain, when wet, the normal amount of solvents, and the further reduction in thickness to effect an exposure of the upper halves of the beads could be accomplished by a manual application of a solvent accompanied by a wiping action to a controlled degree. When the beads had been exposed to the proper extent and the carrier dried, the permanent binder layer 16 then could be applied as described above. Likewise, it is within the teachings of the present invention to first lay down a temporary carrier layer on the paper backing and then sprinkle or dust a quantity of glass beads thereover and press them inwardly to a limited extent while the carrier layer is still tacky. It would not be important as above explained as to how well the beads were embedded in this temporary carrier layer inasmuch as the permanent binder layer could then be laid down over the exposed top portions of the beads.

In Fig. 5 of the drawings, there is shown a modified form of decalcomania produced in accordance with the present invention and which is similar to that of Fig. 1 except that the non-reflecting areas 12 have been omitted and the translucent color layer 17 and the metallic layer 18 have also been omitted. This decalcomania merely comprises a paper backing 30, a water soluble adhesive 31, a temporary carrier 32, glass beads 33 and a permanent binder layer 34. The carrier layer 32 and the permanent binder 34 are composed of the same clear, uncolored, transparent material as in the first form of Fig. 1 and is formed by the screen printing process in exactly the same manner. Without the color layers, therefore, this decalcomania is of the all clear type and has particular application to sign bases which already have a colored surface thereon. To apply, a quantity of clear adhesive is brushed onto the outer surface of the binder layer 34 which is then placed against the colored sign base. The paper backing 30 is then removed by water and the temporary carrier 32 is wiped away by means of a solvent in exactly the same manner as in the first form.

In Fig. 6 of the drawings the present invention is shown as embodied in a decalcomania of the "face up" type. This modification is also produced by the improved process of the present invention and comprises a paper backing 40 coated with a layer of soluble adhesive 41 on which the remainder of the composite transfer is laid down in layers in a manner similar to that described in connection with the first embodiment shown in Fig. 1 but in reverse order. The metallic reflecting layer 42 is screen printed first rather than last and is laid down directly on the soluble adhesive layer 41, and then the translucent color layer 43 is formed over the metallic layer. This color layer is then covered by a film 44 of clear lacquer which is applied in a thickness so as not to exceed one third of the diameter of the glass beads later applied. It is to be understood that each of these films are applied after the preceding one is properly dried and may compose material in accordance with the specific example given or their equivalent.

The last coat to be applied comprises a mixture of a clear carrier and a binder material 46 and glass beads 47, this material being either an ethyl cellulose or a nitrocellulose or any other suitable clear transparent compound with plasticizers and solvents to which is added an equal quantity by volume of glass beads. The material 46 contains a sufficient percentage of evaporable solvents to cause the layer of material to dry down or shrink to approximately fifty percent of its thickness when wet. However, this material in the face up type of decalcomania serves not only as the carrier for the glass beads when they are being printed through the screen, but also serves as the permanent binder.

It is not intended that this clear carrier material 46 be removed by a solvent as is the case in the first embodiment of Fig. 1.

The mixture of clear carrier and binder material 46 and glass beads 47 is handled in substantially the same manner as the glass bead mixture of the first embodiment and is applied in exactly the same manner. The thickness of the screen is slightly greater than the diameter of the glass beads thus insuring that substantially one layer of beads will be applied to the clear film 44. Because of the squeegee pressure and the fluidity of the carrier and binder compound after separation of the sheet from the screen, substantially all the bottom faces of the glass beads are arranged in contact with the smooth upper surface of the clear transparent lacquer film 44 so that a relatively smooth, even upper surface of beads is formed without pronounced rough peaks or depressions. When the clear carrier and binder 46 dries down or shrinks, the beads are firmly embedded and held inasmuch as the beads have reached their final and fully embedded position before the binder material has had an opportunity to dry. The beads adjust themselves, or are adjusted by the squeegee, downwardly while the material is still wet and quite flowable rather than when tacky.

The manner of application of the transfer of this face up type of decalcomania to a sign base is well understood in the art. The entire transfer is first dipped in water to soften the adhesive layer 41 after which the transfer comprising the layers 42, 43, 44 and 46 and 47 is slid therefrom and applied to a sign base. The soluble adhesive 41 may be utilized to secure the metallic layer 42 against the sign base or additional adhesive or cement may be added. Then the transfer is rolled down flat under pressure to securely affix the same to the base.

The process comprising the present invention may be utilized to form reflecting films on any supporting surfaces and these supporting surfaces may be either temporary in nature such as decalcomania paper or they may be permanent such as a sign base or a base intended to be affixed or supported in visual position. Hence, the reflecting film of the present invention may be screen printed or applied directly to a sign base in any suitable manner. For instance, the mixture of glass beads 47 and carrier and binder material 46 may alone be readily applied over any surface in any suitable manner and the film thus produced would have great utility. It would provide a brilliantly reflective film which could be applied in a single manner in a single operation at a minimum of expense and effort, and any old existing surfaces could be restored to a brilliant efficiency by use of the single film.

Although there has been described in detail improved and novel processes comprising the present invention in accordance with which the several forms of reflecting decalcomanias, films and signs may be produced, it is to be understood that changes and modifications in the details and steps of the processes may be resorted to without departing from the spirit and scope of the present invention as defined in the appended claims.

I claim:

1. The method of forming a reflecting decalcomania containing a multiplicity of small transparent glass beads which comprises applying to a releasable backing a layer of reflecting material, applying a layer of transparent material over said reflecting layer, squeegeeing through a stencil screen onto said transparent layer a mixture of a multiplicity of small transparent glass beads of substantially uniform diameter and a binder of transparent liquid material containing a relatively large quantity of an evaporable solvent such that the binder material is capable of drying to a reduced thickness to expose the upper portions of the beads, the thickness of said screen being only slightly greater than the diameter of the glass beads whereby to permit substantially only a single layer of beads to enter the interstices of the screen, and drying said binder material to permanently embed the lower portions of the beads in said binder layer and to expose the upper portions thereof.

2. The method of forming a reflecting decalcomania containing a multiplicity of small transparent glass beads which comprises squeegeeing through a stencil screen onto a releasable backing a mixture of a multiplicity of small transparent glass beads of substantially uniform diameter and a temporary carrier material in liquid form, the thickness of said screen being only slightly greater than the diameter of the glass beads whereby to permit substantially only a single layer of beads to enter the interstices of the screen, permitting the beads to settle into contact with the backing and drying the carrier material, eliminating the upper portion of the dried carrier layer to expose the upper portions of the glass beads, applying a layer of permanent binder material in liquid form over the remainder of the carrier layer and over and between the upper portions of the glass beads, said binder material being strongly adherent to the beads but readily releasable from said carrier material, and then drying the binder material to permanently embed the upper portions of said beads in said binder layer.

3. The method of forming a reflecting decalcomania containing a multiplicity of small transparent glass beads which comprises squeegeeing through a stencil screen onto a releasable backing a mixture of a multiplicity of small transparent glass beads of substantially uniform diameter and a temporary carrier material in liquid form, the thickness of said screen being only slightly greater than the diameter of the glass beads whereby to permit substantially only a single layer of beads to enter the interstices of the screen, permitting the beads to settle into contact with the backing and drying the carrier material, applying a solvent to and wiping away the upper portion of the carrier layer to expose the upper portions of the glass beads, applying a layer of permanent binder material in liquid form over the remainder of the carrier layer and over and between the said upper portions of the glass beads, said binder material being strongly adherent to the beads but readily releasable from said carrier material, and then drying the binder material to permanently embed the upper portions of said beads in said binder layer.

4. The method of forming a reflecting film containing a multiplicity of small transparent glass beads which comprises squeegeeing a mixture of a liquid carrier material and a multiplicity of small transparent glass beads of substantially uniform diameter through a stencil screen onto a supporting surface, the thickness of said screen being only slightly greater than the diameter of the glass beads whereby to permit substantially only a single layer of beads to enter the interstices of the screen and said carrier material containing a relatively large quantity of an evaporable solvent such that the viscosity of the carrier material permits said glass beads to settle therethrough into contact with the supporting surface and said carrier material being capable of drying to a removable film of reduced thickness, and drying the mixture to form said film of reduced thickness whereby to expose the upper portion of said beads.

5. The method of forming a reflecting film containing a multiplicity of small transparent glass beads which comprises squeegeeing a mixture of a liquid carrier material and a multiplicity of small transparent glass beads of substantially uniform diameter through a stencil screen onto a supporting surface, the thickness of said screen being only slightly greater than the diameter of the glass beads whereby to permit substantially only a single layer of beads to enter the interstices of the screen and said carrier material containing a relatively large quantity of an evaporable solvent such that the viscosity of the carrier material permits said glass beads to settle therethrough into contact with the supporting surface and said carrier material being capable of drying to a removable film of reduced thickness for exposing the upper portions of said glass beads, drying said mixture to form said film of reduced thickness whereby to expose the upper portions of said glass beads, applying a liquid comprising a permanent binder material over and between the exposed upper portions of said beads, said binder material being strongly adherent to the beads but readily releasable from said carrier material, and drying said binder material to permanently embed said beads therein.

6. The method of forming a reflecting film containing a multiplicity of small transparent glass beads which comprises squeegeeing a mixture of a liquid carrier material and a multiplicity of small transparent glass beads of substantially uniform diameter through a stencil screen onto a supporting surface, the thickness of said screen being only slightly greater than the diameter of the glass beads whereby to permit substantially only a single layer of beads to enter the interstices of the screen and said carrier material containing a relatively large quantity of an evaporable solvent such that the viscosity of the carrier material permits said glass beads to settle therethrough into contact with the supporting surface and said carrier material being capable of drying to a removable film of reduced thickness for exposing the upper portions of said glass beads, drying said mixture to form said film of reduced thickness whereby to expose the upper portions of said glass beads, applying a liquid comprising a permanent binder material over and between the exposed upper portions of said beads, said binder material being strongly adherent to the beads but readily releasable from said carrier material, drying said binder material to permanently embed said beads therein, and subsequently removing the film of carrier material to expose the lower portions of the beads.

7. The method of forming a reflecting decalcomania containing a multiplicity of small transparent glass beads which comprises squeegeeing through a stencil screen onto a releasable backing a mixture of a temporary removable carrier material in liquid form and a multiplicity of small transparent glass beads of substantially uniform diameter, the thickness of said screen being only slightly greater than the diameter of the glass beads whereby to permit substantially only a single layer of beads to enter the interstices of the screen and said carrier material containing a relatively large quantity of an evaporable solvent such that the viscosity of the carrier material permits said glass beads to settle therethrough into contact with said backing and said carrier material being capable of drying to a removable film of reduced thickness for exposing the upper portions of said glass beads, drying the mixture to form said film of reduced thickness whereby to expose the upper portions of said beads, applying a layer of a permanent binder material in liquid form over and between the exposed upper portions of the beads, said binder material being strongly adherent to the beads but readily releasable from said carrier material, and drying the binder layer to permanently embed the beads therein.

8. The method of forming a reflecting sign bearing a multiplicity of small transparent glass beads which comprises squeegeeing through a stencil screen onto a releasable backing a mixture of a multiplicity of small transparent glass beads of substantially uniform diameter and a temporary carrier material in liquid form, the thickness of said screen being only slightly greater than the diameter of the glass beads whereby to permit substantially only a single layer of beads to enter the interstices of the screen and said carrier material containing a relatively large quantity of an evaporable solvent such that the viscosity of the carrier material permits said glass beads to settle therethrough into contact with said backing and said carrier material being capable of drying to a removable film of reduced thickness for exposing the upper portions of the beads, drying the mixture to form said film of reduced thickness whereby to expose the upper portions of said beads, applying a layer of a permanent binder material in liquid form over and between the exposed upper portions of the beads, said binder material being strongly adherent to the beads but readily releasable from said carrier material, drying the binder layer to permanently embed the beads in said binder layer, securing the composite structure to a supporting sign base with the binder layer adhered to said base and removing the releasable backing, and then removing the temporary carrier to expose the lower surfaces of the glass beads.

FRANK L. PORTH.

References Cited in the file of this patent

UNITED STATES PATENTS

| Number | Name | Date |
|---|---|---|
| 2,181,573 | Bunker | Nov. 28, 1939 |
| 2,267,787 | Ciavola | Dec. 30, 1941 |
| 2,294,930 | Palmquist | Sept. 8, 1942 |
| 2,354,018 | Heltzer et al. | July 18, 1944 |
| 2,354,048 | Palmquist | July 18, 1944 |
| 2,354,049 | Palmquist | July 18, 1944 |
| 2,379,507 | Deyrupp | July 3, 1945 |
| 2,379,702 | Gebhard | July 3, 1945 |
| 2,386,626 | Nadeau et al. | Oct. 9, 1945 |
| 2,403,752 | Phillippi | July 9, 1946 |
| 2,411,222 | Meigs | Nov. 19, 1946 |
| 2,422,256 | Phillippi | June 7, 1947 |
| 2,430,534 | Rodli | Nov. 11, 1947 |
| 2,440,584 | Heltzer et al. | Apr. 27, 1948 |
| 2,548,872 | Cross et al. | Apr. 17, 1951 |
| 2,559,756 | Buck | July 10, 1951 |
| 2,567,186 | Cross et al. | Sept. 11, 1951 |
| 2,574,971 | Heltzer | Nov. 13, 1951 |
| 2,591,779 | Buck | Apr. 8, 1952 |